United States Patent [19]

White

[11] Patent Number: 5,000,928

[45] Date of Patent: Mar. 19, 1991

[54] PREPARATION OF ULTRA-PURE SILVER NITRATE

[75] Inventor: Weimar W. White, Canaseraga, N.Y.

[73] Assignee: Eastman Kodak Company, Rochester, N.Y.

[21] Appl. No.: 840,611

[22] Filed: Mar. 17, 1986

[51] Int. Cl.$^5$ .......................................... C01B 21/48
[52] U.S. Cl. ..................................... 423/34; 423/395
[58] Field of Search ........................... 423/27, 395, 34

[56] References Cited

U.S. PATENT DOCUMENTS

| | | | |
|---|---|---|---|
| 2,493,396 | 1/1950 | Farber et al. | 423/27 |
| 2,543,792 | 3/1951 | Marasco et al. | 23/102 |
| 2,581,518 | 1/1952 | Critchley | 23/102 |
| 2,614,029 | 10/1952 | Moede et al. | 23/102 |
| 2,752,237 | 6/1956 | Short | 75/118 |
| 2,940,828 | 6/1960 | Moede | 23/102 |
| 3,141,731 | 7/1964 | Dietz | 23/102 |
| 3,222,128 | 12/1965 | Sooryn | 423/395 |
| 3,390,981 | 7/1968 | Hoffman | 75/108 |
| 3,554,883 | 1/1971 | Green | 204/109 |
| 3,800,030 | 3/1974 | Long et al. | 423/491 |
| 4,136,157 | 1/1979 | Asai et al. | 423/395 |
| 4,186,244 | 1/1980 | Deffeyes et al. | 428/570 |

FOREIGN PATENT DOCUMENTS

| | | | |
|---|---|---|---|
| 506137 | 9/1954 | Canada | 423/395 |
| 596302 | 4/1960 | Canada | 423/179.5 |
| 2626316 | 12/1976 | Fed. Rep. of Germany . | |
| 20963 | 2/1977 | Japan | 423/27 |
| 28497 | 3/1977 | Japan | 423/395 |
| 6296 | 1/1978 | Japan | 423/395 |
| 62133 | 5/1980 | Japan | 423/395 |
| 177941 | 11/1982 | Japan | 423/27 |
| 2209 | 1/1983 | Japan | 423/395 |
| 120327 | 11/1959 | U.S.S.R. | 423/395 |
| 504705 | 12/1973 | U.S.S.R. . | |
| 664665 | 5/1979 | U.S.S.R. . | |

Primary Examiner—Wayne A. Langel
Attorney, Agent, or Firm—Alfred P. Lorenzo

[57] ABSTRACT

Ultra-pure silver nitrate is prepared from crude silver by a process comprising the steps of dissolving the crude silver in nitric acid to form a crude silver nitrate solution; adding an alkaline agent, such as sodium hydroxide, to the crude silver nitrate solution to precipitate metallic contaminants and form a partially purified silver nitrate solution; adding a selective reducing agent, such as sodium formate, to the partially purified silver nitrate solution, to reduce silver nitrate to metallic silver and thereby precipitate silver powder while leaving metallic contaminants in solution; dissolving the silver powder in nitric acid to form a highly purified silver nitrate solution; and crystallizing ultra-pure silver nitrate from the highly purified silver nitrate solution.

23 Claims, 1 Drawing Sheet

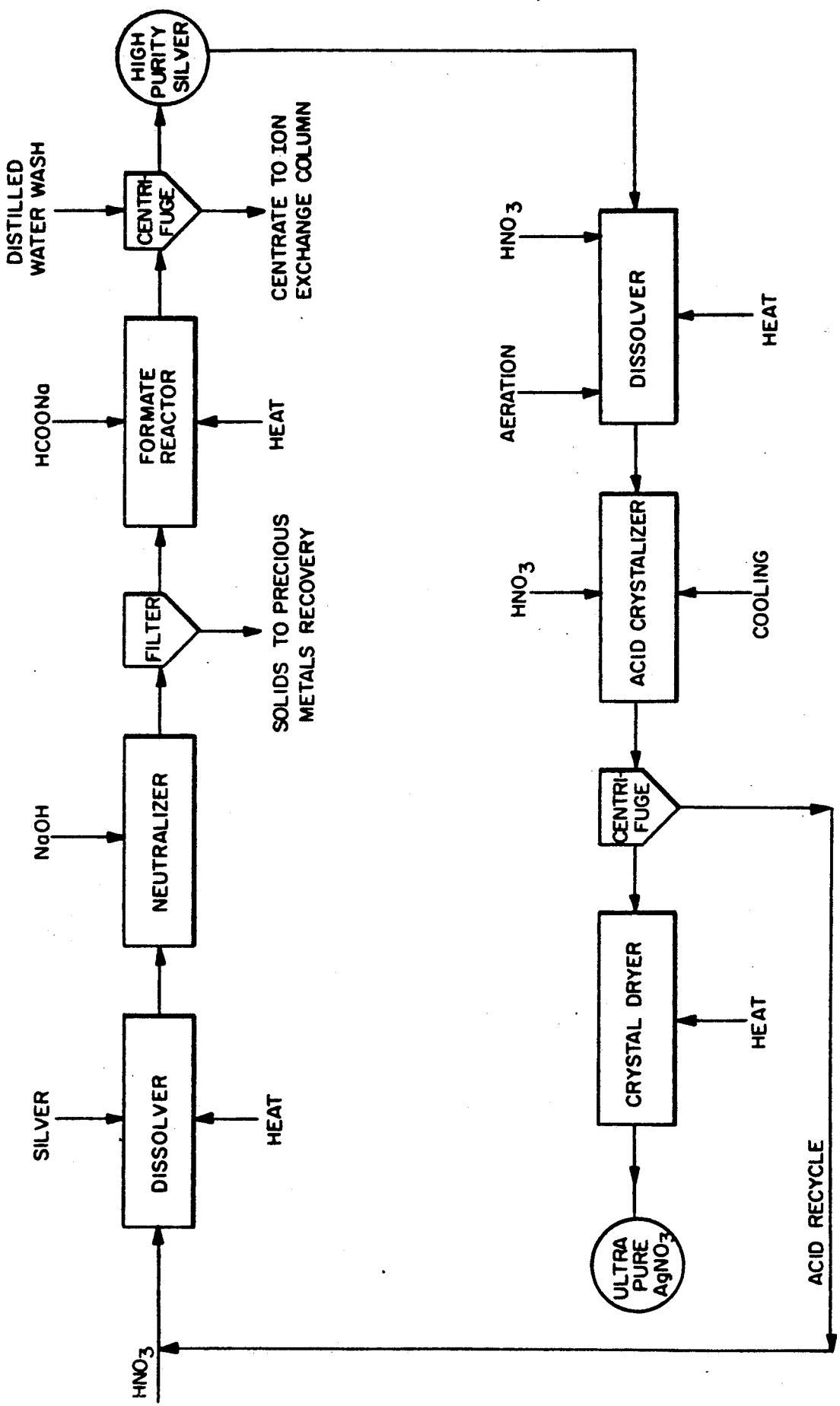

PREPARATION OF ULTRA-PURE SILVER NITRATE

FIELD OF THE INVENTION

This invention relates in general to the manufacture of silver nitrate and in particular to the preparation of silver nitrate with a very high degree of purity. More specifically, this invention relates to a novel multi-step process for converting impure metallic silver to ultra-pure silver nitrate.

BACKGROUND OF THE INVENTION

Silver nitrate which is of very high purity has many important industrial applications, for example, it is required for the manufacture of photographic materials, for certain catalytic uses, and for use in the pharmaceutical industry. In the process that is generally used for preparing silver nitrate, metallic silver is dissolved in nitric acid and the contaminants associated with the metallic silver will contaminate the silver nitrate, unless appropriate steps are taken in the manufacturing process to effectuate their removal. A very wide variety of different contaminants, particularly metallic contaminants, can be present; with the specific contaminants involved and the amounts of each depending on the source of the metallic silver used as a starting material in the process. The contaminants include polyvalent metals such as copper, iron, lead, nickel, tin, bismuth, zinc, chromium, manganese, antimony, cadmium, gold, iridium, palladium, platinum, rhodium, mercury, calcium and magnesium; monovalent metals such as sodium, potassium and lithium; and anions such as sulfate, chloride, bromide, iodide, fluoride, sulfide, phosphate, nitrite, selenite, arsenate, borate and tellurite. Over the years, many different processes have been proposed to achieve removal of such contaminants, and thereby produce silver nitrate of very high purity.

Among the many patents describing the preparation and purification of silver nitrate, the following are representative:

(1) Marasco et al, U.S. Pat. No. 2,543,792, issued Mar. 6, 1951.

This patent describes a process in which an aqueous silver nitrate solution is brought into successive contact with elemental carbon, activated alumina and silver oxide to remove metallic impurities.

(2) Moede et al, U.S. Pat. No. 2,614,029, issued Oct. 14, 1952.

This patent describes a process in which an aqueous silver nitrate solution is treated with sufficient silver oxide to attain a pH of at least 6.1, precipitated metals and metal hydroxides are separated from the solution, and the solution is brought into contact with a water-insoluble, porous, solid adsorbent such as activated alumina or magnesia.

(3) Moede, U.S. Pat. No. 2,940,828, issued June 14, 1960.

This patent describes a process in which an aqueous silver nitrate solution is treated with sufficient silver oxide to attain a pH of at least 6.1, the solution is exposed to ultraviolet light, then filtered, and then brought into contact with a water-insoluble, porous, solid adsorbent such as activated alumina or magnesia.

(4) Dietz, U.S. Pat. No. 3,141,731, issued July 21, 1964.

This patent describes a two-step process in which an aqueous silver nitrate solution is first treated with silver oxide to increase the pH and precipitate certain of the contaminants, and then heated to a temperature of about 75° C. to about 95° C. and further treated by addition of iron, usually in the form of iron nitrate, and silver oxide to precipitate the remaining contaminants.

(5) Green, U.S. Pat. No. 3,554,883, issued Jan. 12, 1971.

This patent describes a process comprising the steps of mixing a silver nitrate solution with silver oxide in a proportion sufficient to give a pH in the range from about 5.1 to about 5.8 and form a precipitate, removing the precipitate to leave a partially purified solution, mixing the partially purified solution with silver oxide in a proportion sufficient to give a pH in the range from about 5.9 to about 6.3 and form a second precipitate, and removing the second precipitate to yield a purified solution.

(6) Long et al, U.S. Pat. No. 3,800,030, issued Mar. 26, 1974.

This patent describes a process in which gaseous acetylene or methylacetylene is bubbled into a silver nitrate solution to cause a selective reaction with the silver and the reaction product is separated to thereby leave the contaminants in solution.

(7) Asai et al, U.S. Pat. No. 4,136,157, issued Jan. 23, 1979.

This patent describes a process in which metallic silver is dissolved in nitric acid to form a silver nitrate solution, aluminum ion is added to the silver nitrate solution, the pH is adjusted by addition of silver oxide to thereby form a precipitate, and the precipitate is separated from the silver nitrate solution.

The processes of the prior art suffer from serious deficiencies which have hindered their industrial utilization. For example, some of these processes are complex and costly, and some involve steps which are quite hazardous. Moreover, they are often ineffective in providing silver nitrate of a very high degree of purity. Such silver nitrate is referred to herein as "ultra-pure" silver nitrate, by which is meant silver nitrate in which all, or almost all, contaminants have been reduced to exceedingly low levels, such as levels of below one part per million by weight and often below one tenth of one part per million by weight. Ultra-pure silver nitrate is particularly valuable in the manufacture of photographic materials in that many contaminants, even when present in exceedingly small amounts, can have very serious adverse effects on the properties of such materials. Thus, the present invention is of particular benefit to the photographic industry, although it has utility wherever silver nitrate of exceptional purity is needed.

It is toward the objective of providing an industrially feasible and economically practical process that will provide ultra-pure silver nitrate that the present invention is directed.

SUMMARY OF THE INVENTION

The present invention provides a novel process for the manufacture of ultra-pure silver nitrate from crude silver that contains metallic contaminants. The process comprises the steps of:

(1) dissolving the crude silver in nitric acid to form a crude silver nitrate solution, (2) adding an alkaline agent to the crude silver nitrate solution to precipitate metallic contaminants and form a partially purified silver nitrate solution, (3) adding a selective reducing agent to the partially purified silver nitrate solution to reduce silver nitrate to metallic silver and thereby precipitate silver powder while leaving metallic contaminants in solution, (4) dissolving the silver powder in nitric acid to form a highly purified silver nitrate solution, and (5) crystallizing ultra-pure silver nitrate from the highly purified silver nitrate solution.

While the individual purification steps employed in the process of this invention are not per se novel, their use in combination to provide ultra-pure silver nitrate represents a new process, and they function in this combination in an unexpected and synergistic manner to provide, as a result of their combined interactions, a product which is remarkably pure, i.e., in which all, or almost all, of the individual contaminants have been removed to a level of less than one part per million by weight, and many have been removed to even lower levels.

BRIEF DESCRIPTION OF THE DRAWINGS

The single FIGURE of the drawing is a schematic flow diagram illustrating the novel multi-step process of this invention.

DETAILED DESCRIPTION OF THE INVENTION

The silver which is used as a starting material for the manufacture of silver nitrate in the process of this invention can come from a variety of sources, and any of a very large number of metallic contaminants, as well as non-metallic impurities, may be associated therewith. Silver bars having a purity of 99.9 to 99.99 percent serve as a useful starting material. However, silver of much lower purity can be used, such as silver from an electrolytic refining process, which may have a purity of as low as about 95% and silver from a smelting operation which may have a purity of as low as 90% or less.

In the first step of the process, the crude silver is dissolved in nitric acid to form a crude silver nitrate solution. To effect dissolution of the crude silver, the nitric acid should be slowly heated at temperatures up to about 90° C.

The equation for the reaction of silver with nitric acid can be expressed as follows:

$$4Ag + 6HNO_3 \rightarrow 4AgNO_3 + NO + NO_2 + 3H_2O$$

After dissolving the crude silver, the resulting crude silver nitrate solution should preferably be diluted with water. The dilution step is particularly useful in improving the extent of purification which is achieved in the subsequent precipitation step. Preferably, the solution is diluted to about a 15 to 25 percent by weight concentration of silver nitrate. The advantage of diluting is that many of the metallic impurities and also such impurities as sulfur and halogens, which are precipitated in the form of silver sulfide and silver halides, respectively, are much less soluble in a dilute silver nitrate solution than in a concentrated silver nitrate solution.

An alkaline agent is added to the crude silver nitrate solution to precipitate metallic contaminants and form a partially purified silver nitrate solution. Useful alkaline agents include: silver oxide; alkali metal hydroxides such as sodium hydroxide, potassium hydroxide and lithium hydroxide; alkali metal carbonates such as sodium carbonate; alkaline earth metal oxides such as calcium oxide; alkaline earth metal carbonates such as calcium carbonate; alkaline earth metal hydroxides such as calcium hydroxide; and heavy metal hydroxides such as ferric hydroxide. Because of their low cost and effectiveness, alkali metal hydroxides are preferred for use as the alkaline agent, and sodium hydroxide is particularly preferred. Sufficient alkaline agent should be added to give a pH in the range of from about 5.5 to about 6.5 and more preferably in the range of from about 5.7 to about 6.0. Too high a pH in this step will result in excessive loss of silver as a silver oxide precipitate, while too low a pH will be ineffective in precipitating the metallic contaminants.

Addition of an alkaline agent, such as sodium hydroxide, results in precipitation of metallic contaminants in various forms. For example, selenium is precipitated as the selenite ($SeO_3$), tellurium is precipitated as the tellurite ($TeO_3$), arsenic is precipitated as the arsenate ($AsO_4$), gold is precipitated as the metal, palladium is precipitated as the oxide and most other metals are precipitated as oxides, hydrated oxides, or hydroxides. Coprecipitation of complex compounds can occur. The anions such as chloride, bromide, iodide, sulfide and phosphate also precipitate, most probably as compounds of silver. Some silver is also precipitated, probably as hydrated silver oxide.

Following the precipitation step, the precipitate is separated from the silver nitrate liquor. This can be carried out by any suitable means of separating a solid from a liquid, such as by centrifugation or filtration. The precipitate contains some silver, most of the base metal contaminants, and most of the precious metals such as gold, palladium, platinum, and rhodium. The silver and precious metals can be recovered from the precipitate by the use of any of several processes which are well known in the art. Impurities left behind in the silver nitrate solution typically include alkali metals, alkaline earth metals, small amounts of precious metals that were not completely removed, base metals that were not completely removed such as iron, copper and lead, and anions that were not completely removed, such as selenite, tellurate and arsenate.

If desired, the precipitate can be refined by a smelting process and the silver recovered can be used as a starting material in the process of this invention. This will eventually result in a build up of precious metals such as gold and palladium in the precipitate. When this occurs, the precipitate can be temporarily diverted for hydrometallurgical recovery of gold and palladium.

The next step of the process involves addition to the silver nitrate solution of a selective reducing agent to precipitate silver powder. The term "selective reducing agent", as used herein, means an agent which will reduce silver nitrate to metallic silver but will not, to any substantial extent, reduce to a metallic state the contaminants that are present in the silver nitrate solution. Many different compounds can be used as selective reducing agents in the process of this invention. Examples of such compounds include formic acid, metal formates, ammonium formate, hydrazine, metal borohydrides, iron(II) sulfate, tin(II) sulfate, hypophosphorus acid, metal hypophosphites, sulfurous acid, salts of sulfurous acid, hydroxylamine, organic hydroxy acids such as tartaric acid and ascorbic acid, sugars, aldehydes, hydroquinone, salts of hydrosulfite, metals higher than silver in the electromotive series of the elements such as aluminum, zinc and copper, and reducing gases such as carbon monoxide and hydrogen.

Metal formates, especially alkali metal formates and most especially sodium formate, are preferred selective reducing agents for use in the method of this invention. Sodium formate is particularly preferred because of its low cost, its convenient handling characteristics, its high degree of selectivity, its rapid reaction rate, the fact that it does not degrade to species that would themselves contaminate the system, and the fact that it provides silver powder of a size that is easily handled.

The reaction of silver nitrate with sodium formate can be represented by the following equations:

$$AgNO_3 + HCOONa \rightarrow HCOOAg + NaNO_3$$

$$2 HCOOAg \rightarrow 2\,Ag + HCOOH + CO_2$$

$$2\,AgNO_3 + HCOOH \rightarrow 2\,Ag + CO_2 + 2 HNO_3$$

In carrying out the reduction, the sodium formate should preferably be used in at least a ten percent excess over stoichiometric.

In the step in which silver powder is precipitated by the action of a selective reducing agent, a very substantial improvement in purity is achieved. Thus, for example, alkali metals, alkaline earth metals, base metals and anions are all left behind in solution. However, separation is, of course, not total and some contaminants will be precipitated along with the silver, for example, elements such as gold, palladium, platinum and rhodium, which have been reduced to the atomic state, and elements such as iron, bismuth, tin and aluminum, which will precipitate in the form of compounds.

As a result of the action of the selective reducing agent, silver is precipitated in finely-divided particulate form, typically with an average particle diameter of about 10 micrometers or less. The reduction of silver nitrate to the powder is virtually complete and therefore little ionic silver remains in solution, for example, less than about 0.6 micrograms of silver per milliliter.

It is a very important feature of the method of this invention that the step of treating the silver nitrate solution with a selective reducing agent takes place subsequent to the step in which metal contaminants have been removed by precipitation through the action of an alkaline agent. Since the selective reduction step takes place only after a major part of many contaminants has already been removed, it is able to do a particularly effective job in lowering the concentration of remaining contaminants. In other words, the selective reduction and resulting purification takes place in an environment relatively free of contaminants, and thus under conditions where it is most effective.

A further important feature of the process of this invention is that the silver nitrate solution can be diluted with water prior to the addition of an alkaline agent to precipitate contaminants. The dilution improves the effectiveness of the precipitation step. It is not practical to dilute in prior art processes, such as that of Green, U.S. Pat. No. 3,554,883, issued Jan. 12, 1971, because the added water would have to be removed by evaporation, and this would greatly increase the cost of the process. In the process of this invention, the water added to dilute does not have to be removed by evaporation, because it is contained in the liquor that is left behind when the selective reduction step precipitates the silver as a powder.

After the selective reduction step, the silver powder is separated from the liquor by a suitable procedure, such as centrifuging, and is washed several times with distilled water.

The next step of the process is to dissolve the silver powder in nitric acid. This can be carried out in any suitable vessel and is greatly facilitated by heating and aerating, which serves to remove the oxides of nitrogen and to reduce the level of the nitrate anion, which is an especially undesirable contaminant if the silver nitrate is to be used in the manufacture of photographic materials.

After dissolving the silver powder in nitric acid, appropriate steps are taken to bring about crystallization of silver nitrate from the solution. This can be done by concentrating and/or cooling of the solution, by the addition of nitric acid or a metal nitrate such as sodium nitrate, or by dilution with a semi-polar organic solvent, such as a long chain alcohol. Most preferably, it is done by adding sufficient concentrated nitric acid to the solution to form crystals of silver nitrate. A suitable temperature for effecting crystallization by the addition of concentrated nitric acid is a temperature of about 20° C. The temperature utilized is not critical, but can have a significant effect on the yield that is achieved.

The final steps in the process of this invention are to separate the silver nitrate crystals from the acid by a suitable technique, such as centrifuging, and then dry the crystals by a suitable procedure, such as heating in an oven at about 90° C. Advantageously, the acid that is recovered is recycled to the first step of the process, where it is used to dissolve the crude silver.

The process described hereinabove is further illustrated by the schematic flow diagram that serves as the single figure of the drawing. The flow diagram illustrates a preferred embodiment of the invention. As shown therein, impure silver is dissolved in hot nitric acid; the resulting crude silver nitrate liquor is diluted with water; the pH is adjusted to the desired level by addition of sodium hydroxide; the resulting suspension is filtered; and the liquor is reacted with sodium formate under conditions of mild heating to form silver powder, which is separated from the liquor by use of a centrifuge. The liquor from the centrifuge is treated by ion exchange to recover valuable components present therein. The silver powder is dissolved in hot nitric acid and, after cooling the resulting solution and sparging with air, concentrated nitric acid is added to form crystalline silver nitrate. The crystals of silver nitrate are separated from the acid by centrifuging, the acid is recycled for use in the process, and the crystals are dried under mild drying conditions.

The invention is further illustrated by the following examples of its practice. In these examples, the concentration of contaminants is reported in nanograms (ng) per gram. A concentration of 1,000 ng/g corresponds to one part per million (ppm) by weight. In the tables of analytical data provided in the examples, the symbol X is used to indicate conditions where the measurement referred to is not applicable or was not carried out.

Example 1

In this example, the crude silver utilized as a starting material was silver from an electrolytic refining process of the type described in Green, U.S. Pat. No. 3,554,883, issued Jan. 12, 1971. The crude silver had a purity of greater than 99.9 percent.

To each of two 22-liter flasks, there was added 2,250 grams of the crude silver in finely-divided particulate form and 2,800 milliliters of concentrated reagent-grade nitric acid. The flasks were heated at 50°-90° C. until all the silver was dissolved, and the liquor was diluted to 14 liters in each flask by addition of water. While agitating with an air-driven glass stirrer, a 30% by weight reagent grade sodium hydroxide solution was added to the warm liquor in each flask to adjust the pH to 6.1, the resulting suspension was filtered to separate the precipitate, and the precipitate was washed several times with distilled water. To the silver nitrate liquor recovered from the filtering step, there was added 1,680 grams of practical grade sodium formate (HCOONa), while maintaining the temperature below 40° C., and reaction was allowed to proceed for approximately 30 minutes while stirring with an air-driven glass stirrer. The temperature was increased to 90° C. and maintained at this level for two hours while continuing to stir. The silver powder which precipitated was separated from the liquor and washed eight times with 3.5 liters of distilled water per wash for each flask.

To a 22-liter flask, there was added 5,600 milliliters of reagent-grade nitric acid, and the moist silver powder was slowly added thereto to form a silver nitrate solution. After filtering, the silver nitrate solution was heated for 3 hours at approximately 80° C. while sparging air into the liquor at a rate of 28.3 liters per hour. While stirring, 5,400 milliliters of concentrated nitric acid was added to the flask to crystallize the silver nitrate, and the suspension was cooled to 20° C. without stirring. The silver nitrate was then suction-filtered onto a fritted-glass filter, washed with 200 milliliters of concentrated reagent-grade nitric acid, air-dried for about 30 minutes, and heated at 90° C. in an oven to complete the drying.

The amount of ultra-pure silver nitrate recovered was 5.9 kilograms, which represents a yield of 84%. Analytical data for the crude silver, the silver powder recovered from the reduction step, and the ultra-pure silver nitrate product are reported in Table I below.

TABLE I

| Contaminant | Concentration in Crude Silver (ng/g) | Concentration in Silver Powder (ng/g) | Concentration in Ultra-Pure Silver Nitrate Product (ng/g) |
| --- | --- | --- | --- |
| Cu | 300 | 50 | 45 |
| Fe | 2,000 | 360 | 110 |
| Pb | 2,000 | <4 | <4 |
| Ni | 400 | <20 | 41 |
| Sn | 900 | <15 | <15 |
| Bi | 150 | <18 | <18 |
| Zn | <5,000 | 610 | <410 |
| Cr | 250 | 43 | <6 |
| Mn | <20 | 37 | 1 |
| Sb | 20,000 | <10 | 15 |
| Cd | <15,000 | <1 | <1 |
| Au | 1,300 | <30 | <20 |
| Ir | <40 | <60 | <40 |
| Pd | 4,400 | <8 | <5 |
| Pt | <10 | <15 | <10 |
| Rh | <10 | <15 | <10 |
| $SeO_3$ | 450 | <50 | <50 |
| $TeO_3$ | 670 | <30 | <30 |
| $AsO_4$ | X | 35 | 49 |
| Hg | 7 | <3 | 3 |
| $NO_2$ | X | X | 119 |
| $SO_4$ | 300,000 | X | <10,000 |
| S | X | X | <20 |
| AgCl | X | X | <80,000 |
| $H_2O$ INSOL. | X | X | <0.02% |
| $H_2O$ | X | X | 0.022% |

Examples 2-6

In these examples, the crude silver utilized as a starting material was as follows:

Example 2—commercially available silver bars of 99.99+% purity.

Example 3—silver of 98.5% purity from a smeltering process.

Example 4—silver of 92.0% purity from a smeltering process.

Example 5—silver of 99.9+% purity from an electrolytic refining process.

Example 6—silver of 99.9+% purity from an electrolytic refining process.

In each example, 2,250 grams of crude silver was processed, following a procedure substantially the same as that described in Example 1. The amounts of ultra-pure silver nitrate obtained and the yields were as follows:

| Example | $AgNO_3$ (kilograms) | Yield (%) |
| --- | --- | --- |
| 2 | 6.1 | 87 |
| 3 | 6.2 | 89 |
| 4 | 5.2 | 80 |
| 5 | 6.2 | 88 |
| 6 | 6.7 | 95 |

For each of Examples 2 to 6, analytical data for the crude silver, the silver powder recovered from the reduction step, and the ultra-pure silver nitrate product are reported, respectively, in Tables II-VI below.

TABLE II

| Contaminant | Concentration in Crude Silver (ng/g) | Concentration in Silver Powder (ng/g) | Concentration in Ultra-Pure Silver Nitrate Product (ng/g) |
| --- | --- | --- | --- |
| Cu | 20,000 | 670 | 39 |
| Fe | 4,000 | 360 | 26 |
| Pb | 4,000 | <4 | <5 |
| Ni | 250 | <20 | 24 |
| Sn | 150 | 240 | 21 |
| Bi | <80 | <18 | 16 |
| Zn | <5,000 | 930 | <340 |
| Cr | <100 | 34 | <14 |
| Mn | 30 | 6 | 4 |
| Sb | <1,500 | <10 | <7 |
| Cd | <15,000 | <1 | 1 |
| Au | 3,325 | <28 | <20 |
| Ir | <40 | <50 | <40 |
| Pd | 5,315 | 15 | <5 |
| Pt | <10 | <14 | <10 |
| Rh | 19 | <14 | <10 |
| $SeO_3$ | 1,000 | 140 | <16 |
| $TeO_3$ | 430 | <30 | <11 |
| $AsO_4$ | X | 82 | <44 |
| Hg | 4 | 5 | <3 |
| $NO_2$ | X | X | 134 |
| $SO_4$ | X | X | <10,000 |
| S | X | X | <40 |
| AgCl | X | X | <12,000 |
| $H_2O$ INSOL. | X | X | <0.02% |
| $H_2O$ | X | X | 0.041% |

TABLE III

| Contaminant | Concentration in Crude Silver (ng/g) | Concentration in Silver Powder (ng/g) | Concentration in Ultra-Pure Silver Nitrate Product (ng/g) |
|---|---|---|---|
| Cu | 900,000 | 580 | 62 |
| Fe | 150,000 | 560 | 120 |
| Pb | 6,800,000 | 5 | 2 |
| Ni | 70,000 | <21 | <21 |
| Sn | 40,000 | <27 | <27 |
| Bi | 2,500 | 29 | 31 |
| Zn | 250,000 | <680 | <680 |
| Cr | 10,000 | 48 | 6 |
| Mn | 1,500 | 9 | 1 |
| Sb | 200,000 | 32 | <6 |
| Cd | 40,000 | 2 | 1 |
| Au | 15,000 | 65 | <20 |
| Ir | X | <52 | <40 |
| Pd | 10,000 | <7 | <5 |
| Pt | X | 65 | <10 |
| Rh | X | <13 | <10 |
| $SeO_3$ | 1,200 | 21 | 20 |
| $TeO_3$ | 1,200 | <26 | <26 |
| $AsO_4$ | X | 40 | <18 |
| Hg | X | 3 | <3 |
| $NO_2$ | X | X | 136 |
| $SO_4$ | X | X | <10,000 |
| S | X | X | <20 |
| AgCl | X | X | <12,000 |
| $H_2O$ | X | X | <0.02% |
| INSOL. $H_2O$ | X | X | 0.017% |

TABLE IV

| Contaminant | Concentration in Crude Silver (ng/g) | Concentration in Silver Powder (ng/g) | Concentration in Ultra-Pure Silver Nitrate Product (ng/g) |
|---|---|---|---|
| Cu | 1,000,000 | 460 | 20 |
| Fe | 150,000 | 2,300 | 46 |
| Pb | 3,700,000 | 25 | <6 |
| Ni | 150,000 | <24 | <25 |
| Sn | 50,000 | <21 | <42 |
| Bi | 2,500 | <13 | <20 |
| Zn | 90,000 | <340 | <250 |
| Cr | 3,000 | 68 | <6 |
| Mn | 600 | 240 | <1 |
| Sb | 500,000 | <7 | <11 |
| Cd | <15,000 | 3 | 20 |
| Au | 30,000 | <24 | <20 |
| Ir | X | <48 | <40 |
| Pd | 50,000 | <6 | <5 |
| Pt | X | 138 | <10 |
| Rh | X | <12 | <10 |
| $SeO_3$ | 23,000 | <16 | <29 |
| $TeO_3$ | 5,600 | <11 | <15 |
| $AsO_4$ | X | <44 | <31 |
| Hg | X | 3 | <2 |
| $NO_2$ | X | X | 140 |
| $SO_4$ | X | X | X |
| S | X | X | <20 |
| AgCl | X | X | <12,000 |
| $H_2O$ | X | X | <0.02% |
| INSOL. $H_2O$ | X | X | 0.018% |

TABLE V

| Contaminant | Concentration in Crude Silver (ng/g) | Concentration in Silver Powder (ng/g) | Concentration in Ultra-Pure Silver Nitrate Product (ng/g) |
|---|---|---|---|
| Cu | 500 | 200 | 12 |
| Fe | 2,000 | 240 | 63 |
| Pb | 3,000 | 8 | 4 |
| Ni | 1,000 | <43 | <43 |
| Sn | 700 | 52 | 12 |
| Bi | <80 | <11 | <11 |
| Zn | <5,000 | 1,000 | <830 |
| Cr | 800 | 140 | <35 |
| Mn | 25 | 35 | <16 |
| Sb | 10,000 | 20 | <22 |
| Cd | <15,000 | <2 | 2 |
| Au | 590 | <28 | <20 |
| Ir | <40 | <56 | <40 |
| Pd | 1,266 | 210 | 25 |
| Pt | 163 | 21 | <10 |
| Rh | <10 | <14 | <10 |
| $SeO_3$ | 830 | <16 | <16 |
| $TeO_3$ | 1,200 | 100 | 92 |
| $AsO_4$ | 730 | 40 | 57 |
| Hg | 4 | <3 | <2 |
| $NO_2$ | X | X | 148 |
| $SO_4$ | X | X | <10,000 |
| S | X | X | <20 |
| AgCl | X | X | <12,000 |
| $H_2O$ | X | X | <0.02% |
| INSOL. $H_2O$ | X | X | 0.021% |

TABLE VI

| Contaminant | Concentration in Crude Silver (ng/g) | Concentration in Silver Powder (ng/g) | Concentration in Ultra-Pure Silver Nitrate Product (ng/g) |
|---|---|---|---|
| Cu | 500 | 92 | 22 |
| Fe | 2,000 | 240 | 74 |
| Pb | 3,000 | 6 | <4 |
| Ni | 1,000 | <20 | <43 |
| Sn | 700 | <21 | 52 |
| Bi | <80 | <51 | <11 |
| Zn | <5,000 | <260 | <830 |
| Cr | 800 | 48 | <35 |
| Mn | 25 | 8 | <16 |
| Sb | 10,000 | <23 | <22 |
| Cd | <15,000 | <1 | 2 |
| Au | 590 | <24 | <20 |
| Ir | <40 | <48 | <40 |
| Pd | 1,266 | 6 | <5 |
| Pt | 163 | <12 | <10 |
| Rh | <10 | <12 | 10 |
| $SeO_3$ | 830 | 28 | <16 |
| $TeO_3$ | 1,200 | <15 | 96 |
| $AsO_4$ | 730 | <44 | <28 |
| Hg | 4 | <3 | <2 |
| $NO_2$ | X | X | 169 |
| $SO_4$ | X | X | <10,000 |
| S | X | X | <20 |
| AgCl | X | X | <12,000 |
| $H_2O$ | X | X | <0.02% |
| INSOL. $H_2O$ | X | X | 0.014% |

As shown by the above examples, in the process of this invention a step in which contaminants are precipitated by the action of an alkaline agent, thereby leaving most of the silver in solution, is followed by a step in which silver is precipitated by the action of a selective reducing agent, thereby leaving most of the remaining contaminants in solution, which in turn is followed by a crystallization step, thereby leaving in solution virtually all contaminants not previously removed. This series of steps, carried out in this order, has been unexpectedly found to provide silver nitrate of remarkable purity. In comparison with prior art processes, the process of this invention is highly advantageous. Thus, for example in the process of this invention, metals such as lead, cadmium, palladium, platinum, rhodium and mercury are reduced to levels of less than 0.01 ppm, metals such as copper, chromium, manganese, nickel, tin, bismuth, antimony, gold and iridium are reduced to levels of less than 0.1 ppm, and metals such as iron and zinc are reduced to levels of less than 1 ppm. Moreover, it should be particularly noted that Asai et al, U.S. Pat. No. 4,136,157 issued Jan. 23, 1979, refer to the ability of their process to effectively reduce the level of nickel and zinc as being remarkable. However, their examples show nickel in an amount of as high as 1 ppm, as compared to less than 0.05 ppm in the process of this invention, and zinc in an amount of as high as 3 ppm, as compared to less than 1 ppm in the process of this invention.

As an illustration of how the process of this invention functions, it is useful to consider the effect of the various processing steps on a particular metal contaminant, for example copper. Copper can be present in the crude silver used as a starting material in a wide range of concentrations depending on the source of the silver, for example, the amount of copper could be as little as about 1 ppm (1,000 ng/g) or less, or as much as about 1,000 ppm (1,000,000 ng/g) or more. After the steps of precipitating contaminants by addition of an alkaline agent and precipitating purified silver by use of a selective reducing agent, the amount of copper in the purified silver is typically reduced to levels of less than about 0.5 ppm (500 ng/g) and after the crystallization step, the amount of copper in the ultra-pure silver nitrate is typically less than about 0.05 ppm (50 ng/g).

The ultra-pure silver nitrate produced by the process of this invention is especially useful in the manufacture of photographic emulsions because all contaminants that have adverse photographic effects have been essentially eliminated. In particular, the level of virtually all of such contaminants has been reduced to below one ppm.

The process described herein can be referred to as a three-step purification process in that it employs three steps in succession in which purity is enhanced, namely, (1) a precipitation step in which an alkaline agent is employed, (2) a reduction step in which a selective reducing agent is employed, and (3) a crystallization step. The overall result of using these steps in this order is a remarkably pure product, and this is the case even when the crude silver used as a starting material is a very severely contaminated material, such as silver taken directly from a smeltering operation. The process of the invention has many advantages in comparison with the prior art. For example, it enables the silver inventory to be maintained at a low level compared to electrorefining processes commonly utilized in this art. It purifies silver by removing impurities while silver is in the ionic state and while silver is in the atomic state, whereas the processes of the prior art are typically confined to removing impurities while silver is in the ionic state. It does not allow for build up of impurities in the process, unlike conventional prior art systems which have no way of removing alkali or alkaline earth metals and therefore encounter a gradual build up and resulting contamination of the product with these metals.

By use of the process of this invention, there is no need to carry out an electrorefining process to obtain silver nitrate of the purity needed for photographic manufacturing operations, and thus a major saving in capital investment and operating costs can be achieved through elimination of the complex and costly electrorefining equipment. Moreover, since the process of this invention is capable of providing the desired ultra-pure silver nitrate product from a wide variety of silver starting materials—such as commercial silver in bar form, electrorefined silver, and silver from a smelter—it has a high degree of flexibility in regard to freedom to combine starting materials from a variety of sources.

The invention has been described in detail with particular reference to preferred embodiments thereof, but it will be understood that variations and modifications can be effected within the spirit and scope of the invention.

I claim:

1. A process for the manufacture of ultra-pure silver nitrate from crude silver that contains metallic contaminants, said process including the steps of: (1) dissolving the crude silver in nitric acid to form a crude silver nitrate solution, (2) diluting the crude silver nitrate solution with water, (3) adding an alkaline agent to the crude silver nitrate solution to precipitate metallic contaminants and form a partially purified silver nitrate solution; (4) adding a selective reducing agent to the partially purified silver nitrate solution to precipitate silver powder while leaving metallic contaminants in solution; (5) dissolving the silver powder in nitric acid to form a highly purified silver nitrate solution; and (6) crystallizing ultra-pure silver nitrate from the highly purified silver nitrate solution.

2. A process as claimed in claim 1 wherein the crude silver is an electrorefined silver.

3. A process as claimed in claim 1 wherein the crude silver is smelter silver.

4. A process as claimed in claim 1 wherein sufficient alkaline agent is added in step (3) to provide a pH in the range of from about 5.5 to about 6.5.

5. A process as claimed in claim 1 wherein sufficient alkaline agent is added in step (3) to provide a pH in the range of from about 5.7 to about 6.0.

6. A process as claimed in claim 1 wherein silver nitrate is crystallized from the highly purified silver nitrate solution by addition thereto of nitric acid.

7. A process as claimed in claim 1 wherein dissolution of the silver powder in step (5) is promoted by heating and aerating.

8. A process for the manufacture of ultra-pure silver nitrate from crude silver that contains metallic contaminants, said process including the steps of: (1) dissolving the crude silver in nitric acid to form a crude silver nitrate solution, (2) diluting the crude silver nitrate solution with water, (3) adding sodium hydroxide to the crude silver nitrate solution to precipitate metallic contaminants and form a partially purified silver nitrate solution, (4) adding sodium formate to the partially purified silver nitrate solution to precipitate silver powder while leaving metallic contaminants in solution, (5) dissolving the silver powder in nitric acid to form a highly purified silver nitrate solution, and (6) crystallizing ultra-pure silver nitrate from the highly purified silver nitrate solution by addition thereto of nitric acid.

9. A process as claimed in claim 8 wherein said sodium formate is added in at least a ten percent excess over stoichiometric.

10. A process for the manufacture of ultra-pure silver nitrate from crude silver that contains metallic contaminants, said process including the steps of: (1) dissolving the crude silver in nitric acid to form a crude silver nitrate solution, (2) diluting the crude silver nitrate solution with water to a silver nitrate concentration of about 15 to about 25 percent by weight, (3) adding sodium hydroxide to the crude silver nitrate solution to precipitate metallic contaminants and form a partially purified silver nitrate solution, said sodium hydroxide being added in an amount sufficient to provide a pH in the range of from about 5.7 to about 6.0, (4) adding sodium formate to the partially purified silver nitrate solution to precipitate silver powder while leaving metallic contaminants in solution, (5) dissolving the silver powder in nitric acid to form a highly purified silver nitrate solution, and (6) crystallizing ultra-pure silver nitrate from the highly purified silver nitrate solution by addition thereto of nitric acid.

11. A process as claimed in claim 10 wherein said sodium formate is added in at least a ten percent excess over stoichiometric.

12. A process as claimed in claim 10 wherein dissolution of the silver powder in step (5) is promoted by heating and aerating.

13. A process for the manufacture of ultra-pure silver nitrate from crude silver that contains metallic contaminants, said process including the steps of: (1) dissolving the crude silver in nitric acid to form a crude silver nitrate solution, (2) adding an alkali metal hydroxide to the crude silver nitrate solution to precipitate metallic contaminants and form a partially purified silver nitrate solution; (3) adding a selective reducing agent to the partially purified silver nitrate solution to precipitate silver powder while leaving metallic contaminants in solution; (4) dissolving the silver powder in nitric acid to form a highly purified silver nitrate solution; and (5) crystallizing ultra-pure silver nitrate from the highly purified silver nitrate solution.

14. A process as claimed in claim 13 wherein said alkali metal hydroxide is sodium hydroxide.

15. A process for the manufacture of ultra-pure silver nitrate from crude silver that contains metallic contaminants, said process including the steps of: (1) dissolving the crude silver in nitric acid to form a crude silver nitrate solution, (2) adding an alkaline agent to the crude silver nitrate solution to precipitate metallic contaminants and form a partially purified silver nitrate solution; (3) adding a metal formate to the partially purified silver nitrate solution to precipitate silver powder while leaving metallic contaminants in solution; (4) dissolving the silver powder in nitric acid to form a highly purified silver nitrate solution; and (5) crystallizing ultra-pure silver nitrate from the highly purified silver nitrate solution.

16. A process as claimed in claim 15 wherein said metal formate is sodium formate.

17. A process for converting crude silver that contains metallic contaminants to pure silver, said process including the steps of (1) dissolving the crude silver in nitric acid to form a crude silver nitrate solution; (2) diluting the crude silver nitrate solution with water; (3) adding an alkaline agent to the crude silver nitrate solution to precipitate metallic contaminants and form a partially purified silver nitrate solution; (4) adding a selective reducing agent to the partially purified silver nitrate solution to precipitate silver powder while leaving metallic contaminants in solution; and (5) separating the silver powder formed in step (4) from the solution containing the metallic contaminants.

18. A process for converting crude silver that contains metallic contaminants to pure silver, said process including the steps of: (1) dissolving the crude silver in nitric acid to form a crude silver nitrate solution, (2) diluting the crude silver nitrate solution with water to a silver nitrate concentration of about 15 to about 25 percent by weight, (3) adding sodium hydroxide to the crude silver nitrate solution to precipitate metallic contaminants and form a partially purified silver nitrate solution, said sodium hydroxide being added in an amount sufficient to provide a pH in the range of from about 5.7 to about 6.0; (4) adding sodium formate to the partially purified silver nitrate solution to precipitate silver powder while leaving metallic contaminants in solution; and (5) separating the silver powder formed in step (4) from the solution containing the metallic contaminants.

19. A process as claimed in claim 18 wherein said sodium formate is added in at least a 10 percent excess over stoichiometric.

20. A process for the manufacture of ultra-pure silver nitrate from crude silver that contains metallic contaminants, said process including the steps of: (1) dissolving the crude silver in nitric acid to form a crude silver nitrate solution, (2) diluting the crude silver nitrate solution with water to a silver nitrate concentration of about 15 to about 25 percent by weight, (3) adding an alkaline agent to the crude silver nitrate solution to precipitate metallic contaminants and form a partially purified silver nitrate solution; (4) adding a selective reducing agent to the partially purified silver nitrate solution to precipitate silver powder while leaving metallic contaminants in solution; (5) dissolving the silver powder in nitric acid to form a highly purified silver nitrate solution; and (6) crystallizing ultra-pure silver nitrate from the highly purified silver nitrate solution.

21. A process as claimed in claim 20 wherein the alkaline agent is an alkali metal hydroxide and the selective reducing agent is a metal formate.

22. A process as claimed in claim 20 wherein the alkaline agent is sodium hydroxide and the selective reducing agent is sodium formate.

23. A process for converting crude silver that contains metallic contaminants to pure silver, said process including the steps of: (1) dissolving the crude silver in nitric acid to form a crude silver nitrate solution; (2) diluting the crude silver nitrate solution with water to a silver nitrate concentration of about 15 to about 25 percent by weight; (3) adding an alkaline agent to the crude silver nitrate solution to precipitate metallic contaminants and form a partially purified silver nitrate solution; (4) adding a selective reducing agent to the partially purified silver nitrate solution to precipitate silver powder while leaving metallic contaminants in solution; and (5) separating the silver powder formed in step (4) from the solution containing the metallic contaminants.

* * * * *